United States Patent
Palanki et al.

(10) Patent No.: US 9,226,300 B2
(45) Date of Patent: Dec. 29, 2015

(54) HIERARCHICAL CONTROL CHANNEL STRUCTURE FOR WIRELESS COMMUNICATION

(75) Inventors: Ravi Palanki, San Diego, CA (US); Aamod D. Khandekar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 12/498,467

(22) Filed: Jul. 7, 2009

(65) Prior Publication Data

US 2010/0008315 A1 Jan. 14, 2010

Related U.S. Application Data

(60) Provisional application No. 61/080,044, filed on Jul. 11, 2008.

(51) Int. Cl.
| | |
|---|---|
| *H04B 7/00* | (2006.01) |
| *H04B 1/44* | (2006.01) |
| *H04Q 7/00* | (2006.01) |
| *H04Q 7/20* | (2006.01) |
| *H04W 72/08* | (2009.01) |

(52) U.S. Cl.
CPC .................................. *H04W 72/082* (2013.01)

(58) Field of Classification Search
USPC ........... 455/522, 448, 67.11, 226.1, 525, 515, 455/63.1, 450, 452.2, 513, 456.1–6, 466; 370/328, 329, 342, 332
See application file for complete search history.

(56) References Cited

U.S. PATENT DOCUMENTS

| | | | |
|---|---|---|---|
| 6,792,276 B1 | 9/2004 | Butovitsch et al. | |
| 2002/0061073 A1* | 5/2002 | Huang et al. | 375/295 |
| 2002/0145988 A1* | 10/2002 | Dahlman et al. | 370/335 |

(Continued)

FOREIGN PATENT DOCUMENTS

| | | |
|---|---|---|
| CN | 1716830 A | 1/2006 |
| CN | 101133675 A | 2/2008 |

(Continued)

OTHER PUBLICATIONS

International Search Report and Written Opinion—PCT/US2009/050166—ISA/EPO—Dec. 4, 2009.

(Continued)

*Primary Examiner* — Kent Chang
*Assistant Examiner* — William Lu
(74) *Attorney, Agent, or Firm* — Dalei Dong

(57) ABSTRACT

Techniques for sending control information in a wireless network are described. In an aspect, a hierarchical control channel structure may be used, a first group of control channels may be sent in a low reuse segment, and a second group of control channels may be sent in a non-reuse segment. In another aspect, a first control channel is sent in the low reuse segment and is used to configure a second control channel sent in the non-reuse segment so that the second control channel can be reliably received in dominant interference scenarios. In one design, a first base station sends a first message on a first control channel to a user equipment (UE). The UE sends a second message to an interfering base station to request it to reduce interference to a second control channel. The first base station sends control information on the second control channel to the UE.

30 Claims, 7 Drawing Sheets

(56) References Cited

U.S. PATENT DOCUMENTS

| | | | |
|---|---|---|---|
| 2004/0166809 A1* | 8/2004 | Dickey | 455/67.11 |
| 2005/0096062 A1* | 5/2005 | Ji et al. | 455/450 |
| 2005/0147024 A1 | 7/2005 | Jung et al. | |
| 2005/0169229 A1* | 8/2005 | Cho et al. | 370/344 |
| 2005/0265222 A1* | 12/2005 | Gerlach | 370/208 |
| 2006/0003775 A1* | 1/2006 | Bull et al. | 455/456.1 |
| 2006/0062179 A1* | 3/2006 | Simonsson et al. | 370/328 |
| 2006/0140217 A1* | 6/2006 | Jung | H04L 27/2601 370/468 |
| 2006/0148411 A1* | 7/2006 | Cho et al. | 455/67.13 |
| 2006/0212133 A1* | 9/2006 | Damnjanovic et al. | 700/1 |
| 2006/0255989 A1* | 11/2006 | Kim et al. | 341/120 |
| 2006/0268755 A1* | 11/2006 | Pajukoski et al. | 370/282 |
| 2007/0004423 A1* | 1/2007 | Gerlach et al. | 455/452.2 |
| 2007/0042778 A1* | 2/2007 | Keller et al. | 455/443 |
| 2007/0121547 A1* | 5/2007 | Huh et al. | 370/329 |
| 2007/0149242 A1* | 6/2007 | Kim et al. | 455/525 |
| 2007/0207740 A1* | 9/2007 | Dickey | 455/67.11 |
| 2007/0225002 A1* | 9/2007 | Keller et al. | 455/448 |
| 2007/0249361 A1* | 10/2007 | Klang et al. | 455/452.2 |
| 2007/0270155 A1* | 11/2007 | Nelson et al. | 455/452.2 |
| 2007/0293260 A1* | 12/2007 | Xiao et al. | 455/522 |
| 2008/0008147 A1* | 1/2008 | Nakayama | 370/338 |
| 2008/0009301 A1* | 1/2008 | Reudink | 455/513 |
| 2008/0051095 A1* | 2/2008 | Chang et al. | 455/446 |
| 2008/0095133 A1* | 4/2008 | Kodo et al. | 370/342 |
| 2008/0132242 A1* | 6/2008 | Hamalainen | H04W 72/082 455/450 |
| 2008/0137551 A1* | 6/2008 | Li et al. | 370/252 |
| 2008/0188260 A1* | 8/2008 | Xiao et al. | 455/522 |
| 2008/0207201 A1* | 8/2008 | Fischer | 455/434 |
| 2008/0232326 A1* | 9/2008 | Lindoff et al. | 370/332 |
| 2009/0059819 A1* | 3/2009 | Choi et al. | 370/280 |
| 2009/0092086 A1* | 4/2009 | Lee et al. | 370/329 |
| 2009/0279478 A1* | 11/2009 | Nagaraj | H04B 7/022 370/328 |
| 2009/0280747 A1* | 11/2009 | Sudarshan et al. | 455/63.1 |
| 2010/0008315 A1* | 1/2010 | Palanki et al. | 370/329 |
| 2010/0297991 A1* | 11/2010 | Dahlman et al. | 455/422.1 |

FOREIGN PATENT DOCUMENTS

| | | |
|---|---|---|
| EP | 1936829 A1 | 6/2008 |
| JP | 2005244906 A | 9/2005 |
| JP | 2008017325 A | 1/2008 |
| JP | 2009506652 A | 2/2009 |
| JP | 2009525628 A | 7/2009 |
| RU | 2197791 C2 | 1/2003 |
| WO | 9631991 A1 | 10/1996 |
| WO | WO9854853 A1 | 12/1998 |
| WO | 0105179 A1 | 1/2001 |
| WO | WO2007022631 | 3/2007 |
| WO | WO2007024895 A2 | 3/2007 |

OTHER PUBLICATIONS

Taiwan Search Report—TW098123430—TIPO—Jul. 25, 2012.

* cited by examiner

HIERARCHICAL CONTROL CHANNEL STRUCTURE FOR WIRELESS COMMUNICATION

The present application claims priority to provisional U.S. Application Ser. No. 61/080,044, entitled "HIERARCHICAL CONTROL SIGNALING," filed Jul. 11, 2008, assigned to the assignee hereof and incorporated herein by reference.

BACKGROUND

I. Field

The present disclosure relates generally to communication, and more specifically to techniques for sending control channels in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to UEs and may receive data and control information on the uplink from the UEs. On the downlink, a transmission from the base station may observe interference due to transmissions from neighbor base stations. On the uplink, a transmission from a UE may observe interference due to transmissions from other UEs communicating with the neighbor base stations. For both the downlink and uplink, the interference due to interfering base stations and interfering UEs may degrade performance.

SUMMARY

Techniques for sending control information in a wireless communication network are described herein. A UE may desire to communicate with a first base station and may observe high interference from a second base station in a dominant interference scenario. The first and second base stations may have different transmit power levels and/or different association types.

In an aspect, a hierarchical control channel structure may be used to enable reliable reception of control channels. In one design, the control channels for a given link may be divided into two groups. A first group of control channels may be sent in a low reuse segment, may observe less interference, and may be reliably received in all scenarios. A second group of control channels may be sent in a non-reuse segment and may be reliably received in most scenarios except for dominant interference scenarios.

In another aspect, a first control channel may be used to configure a second control channel on a given link. The first control channel may be sent in the low reuse segment and may be reliably received even in dominant interference scenarios. The second control channel may be sent in the non-reuse segment and may be configured via the first control channel so that the second control channel can be reliably received in dominant interference scenarios.

In one design, a first base station may send a first message on a first control channel in the low reuse segment to a UE. The UE may receive the first message and, in response, may send a second message to an interfering base station to request it to reduce interference on designated resources used for a second control channel. The interfering base station may honor the request and may reduce interference on the designated resources. The first base station may send control information on the second control channel in the non-reuse segment to the UE. The UE may reliably receive the control information on the second control channel due to less or no interference on the designated resources from the interfering base station.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
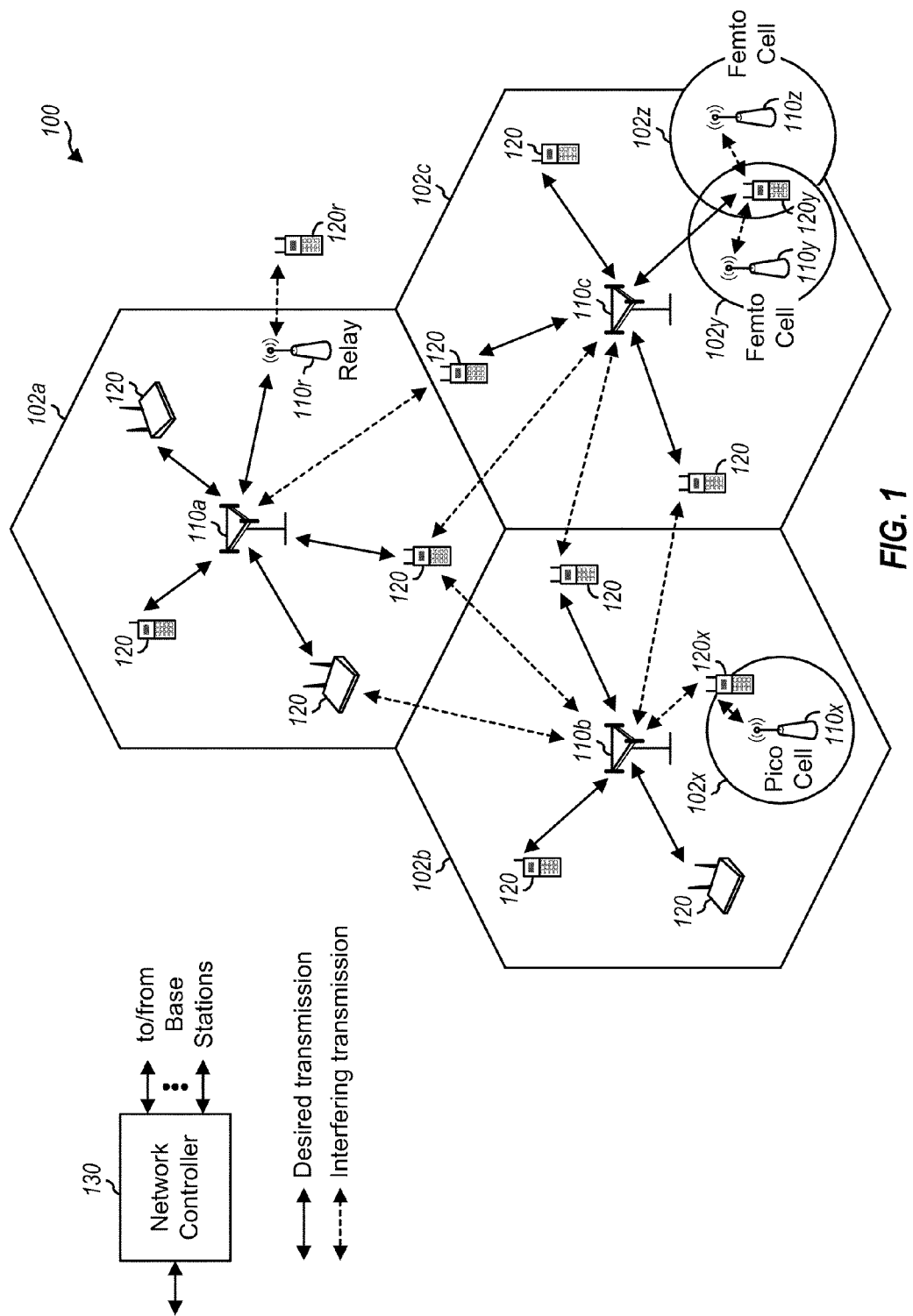
FIG. 1 shows a wireless communication network.

FIG. 1 shows a wireless communication network 100, which may include a number of base stations 110 and other network entities. A base station may be a station that communicates with the UEs and may also be referred to as a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, base stations 110a, 110b and 110c may be macro base stations for macro cells 102a, 102b and 102c, respectively. Base station 110x may be a pico base station for a pico cell 102x. Base stations 110y and 110z may be femto base stations for femto cells 102y and 102z, respectively. A base station may support one or multiple (e.g., three) cells.

Wireless network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1, a relay station 110r may communicate with base station 110a and a UE 120r in order to facilitate communication between base station 110a and UE 120r. A relay station may also be referred to as a relay, a relay station, etc.

Wireless network 100 may be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts) whereas pico base stations, femto base stations, and relays may have a lower transmit power level (e.g., 1 Watt).

A network controller 130 may couple to a set of base stations and may provide coordination and control for these base stations. Network controller 130 may communicate with base stations 110 via a backhaul. Base stations 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro base stations, pico base stations, femto base stations, relays, etc. In FIG. 1, a solid line with double arrows indicates desired transmissions between a UE and a serving base station, which is a base station designated to serve the UE on the downlink and/or uplink. A dashed line with double arrows indicates interfering transmissions between a UE and a base station. In the description herein, a station may be a base station, a UE, a relay, or some other entity.

A UE may be within the coverage of multiple base stations. One of these base stations may be selected to serve the UE. The serving base station may be selected based on various criteria such as geometry, pathloss, etc. Geometry may be quantified by a signal-to-noise ratio (SNR), a signal-to-noise-and-interference ratio (SINR), a carrier-to-interference ratio (C/I), etc.

The UE may operate in a dominant interference scenario, which is a scenario in which the UE may observe high interference from one or more interfering base stations and/or may cause high interference to one or more neighbor base stations. High interference may be quantified by the observed interference exceeding a threshold or based on some other criteria.

A dominant interference scenario may occur due to range extension, which is a scenario in which the UE connects to a base station with lower pathloss and lower geometry among the multiple base stations detected by the UE. For example, in FIG. 1, UE 120x may detect macro base station 110b and pico base station 110x and may have lower received power for base station 110x than base station 110b. Nevertheless, it may be desirable for UE 120x to connect to pico base station 110x if the pathloss for base station 110x is lower than the pathloss for macro base station 110b. This may result in less interference to the wireless network for a given data rate for UE 120x.

A dominant interference scenario may also occur due to restricted association. For example, in FIG. 1, UE 120y may be close to femto base station 110y and may have high received power for base station 110y. However, UE 120y may not be able to access femto base station 110y due to restricted association and may connect to macro base station 110c with lower received power (as shown in FIG. 1) or to femto base station 110z also with lower received power (not shown in FIG. 1). UE 120y may then observe high interference from femto base station 110y on the downlink and may also cause high interference to femto base station 110y on the uplink.

Wireless network 100 may support a set of control channels for the downlink and a set of control channels for the uplink. A control channel is a channel carrying control information, which may comprise any information other than traffic data. For example, control information may include scheduling information, system information, broadcast information, paging information, configuration information, feedback information, commands or orders, etc. Control information may also be referred to as overhead information, signaling, etc. A control channel may be a physical channel, a transport channel, or some other type of channel. A control channel may also be referred to as an overhead channel, a signaling channel, a broadcast channel, a control transmission, a control signal, etc.

In an aspect, a hierarchical control channel structure may be used to enable reliable reception of control channels. In one design, the control channels for a given link may be divided into two groups. Each group may include one or more control channels. A first group of control channels may be sent in a low reuse segment with a reuse factor greater than one. A second group of control channels may be sent in a non-reuse segment with a default/nominal reuse factor of one. A reuse factor of one (or non-reuse) means that a given resource may be used by all base stations in the wireless network. A reuse factor of M, where M>1, means that a given resource may be used by only one out of every M base stations. A higher reuse factor (i.e., a larger value of M) corresponds to lower reuse, and vice versa.

A given control channel may be sent in the low reuse segment in various manners. On the downlink, for a planned reuse scheme, a base station may send the control channel on one of M resources that may be assigned to the base station. A designated entity may assign different resources to different base stations. For a random reuse scheme, the base station may send the control channel on a resource that may be pseudo-randomly selected by the base station. For a learned reuse scheme, the base station may detect for interference on different resources and may send the control channel on a resource having the least interference. For all reuse schemes, different base stations may transmit their control channels on different resources in the low reuse segment in order to avoid or reduce interference to one another.

The first group of control channels sent in the low reuse segment may observe less interference and may be reliably received in all or most scenarios. The second group of control channels sent in the non-reuse segment may observe high interference in dominant interference scenarios. The performance of the second group of control channels may be improved in dominant interference scenarios as described below.

Figure 2:
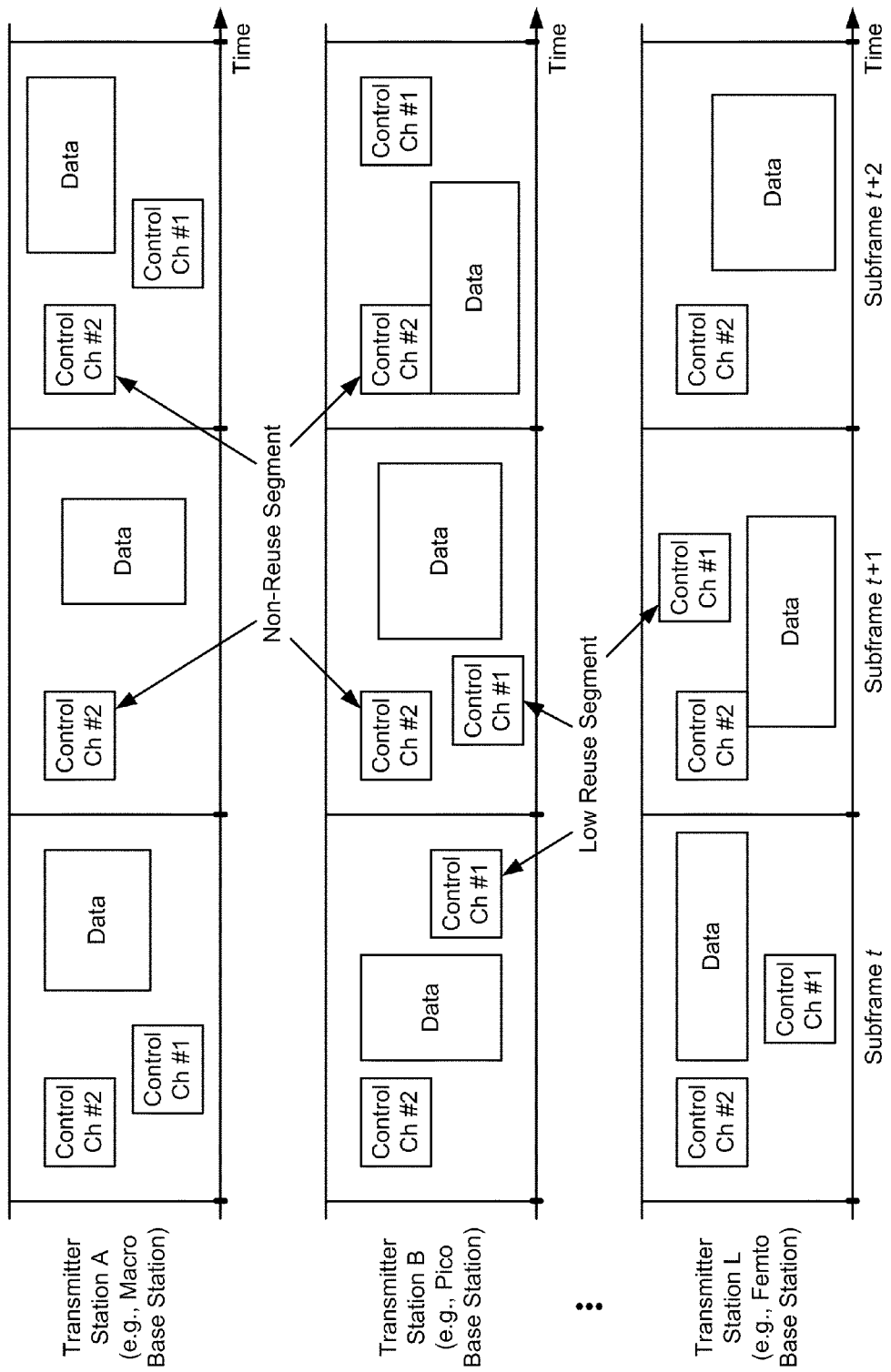
FIG. 2 shows transmissions of control channels on a given link.

FIG. 2 shows exemplary transmissions of control channels on a given link by L transmitter stations A through L, where L may be any integer value. For the downlink, the transmitter stations may be base stations, e.g., of different types as shown in FIG. 2. For the uplink, the transmitter stations may be UEs in different cells. In any case, for each transmitter station, the horizontal axis may represent time, and the vertical axis may represent frequency. The transmission timeline may be partitioned into units of subframes. Each subframe may have a particular duration, e.g., 1 millisecond (ms).

Each transmitter station may transmit a set of control channels. For simplicity, only two control channels #1 and #2 are shown in FIG. 2. Each control channel may be transmitted on resources allocated for that control channel. In general, resources may be quantified by time, frequency, code, transmit power, etc. For example, resources may be quantified by resource blocks in LTE, tiles in UMB, etc. Each control channel may be transmitted in each subframe or in only certain subframes.

In the example shown in FIG. 2, control channel #1 is sent in the low reuse segment, and control channel #2 is sent in the non-reuse segment. The L transmitter stations may transmit their control channel #1 on different resources in a given subframe, as shown in FIG. 2. The L transmitter stations may transmit their control channel #2 on the same resources in a given subframe, as also shown in FIG. 2.

In general, each control channel may be transmitted at a fixed time-frequency location in each subframe in which that control channel is transmitted or at different time-frequency locations in different subframes. In the example shown in FIG. 2, the transmitter stations transmit control channel #2 at a fixed location in each subframe and transmit control channel #1 at different locations in some subframes. The transmitter stations and receiver stations may know the resources used for each control channel of interest. The transmitter stations may also transmit data on resources not used for the control channels.

For the downlink, all base stations may transmit a first group of downlink control channels on different resources in a low reuse segment for the downlink. Different base stations may transmit a second group of downlink control channels on the same resources in a non-reuse segment for the downlink.

For the uplink, all UEs may transmit a first group of uplink control channels on different resources in a low reuse segment for the uplink. UEs in different cells may transmit a second group of uplink control channels on the same resources in a non-reuse segment for the uplink.

In another aspect, a first control channel may be used to configure a second control channel on a given link. The first control channel may be sent in a low reuse segment and may be reliably received even in dominant interference scenarios. The second control channel may be sent in a non-reuse segment and may be reliably received in most scenarios except for dominant interference scenarios. The second control channel may be configured via the first control channel, as necessary, so that the second control channel can be reliably received in dominant interference scenarios.

Using the first control channel to configure the second control channel may enable operation in dominant interference scenarios while improving resource utilization. It may be possible to send the second control channel in a low reuse segment so that it can be reliably received in all scenarios. However, while reuse is good for interference mitigation, it may be inefficient from a resource utilization point of view since each transmitter station can use only a fraction of the total available resources. Resource utilization may be improved by sending the second control channel in a non-reuse segment. The second control channel may be configured, if needed, via the first control channel to enable reliable reception in dominant interference scenarios. The second control channel may thus be able to achieve the benefits of reuse while not occupying too much resources. The first control channel may carry small payloads and may thus occupy a small low reuse segment.

The first control channel may configure the second control channel in various manners. In one design, the first control channel may change the reuse of the second control channel, e.g., by asking an interfering station to reduce interference to the second control channel. In another design, the first control channel may convey resources on which the second control channel is sent. These resources may have less interference from the interfering station. In yet another design, the first control channel may activate transmission of the second control channel. In yet another design, the first control channel may initiate an interference mitigation mechanism (e.g., dynamic fractional frequency reuse (FFR)) on resources associated with the second control channel. The first control channel may also configure the second control channel in other manners. The first control channel may also configure multiple control channels, e.g., with the same or different configurations.

Figure 3:
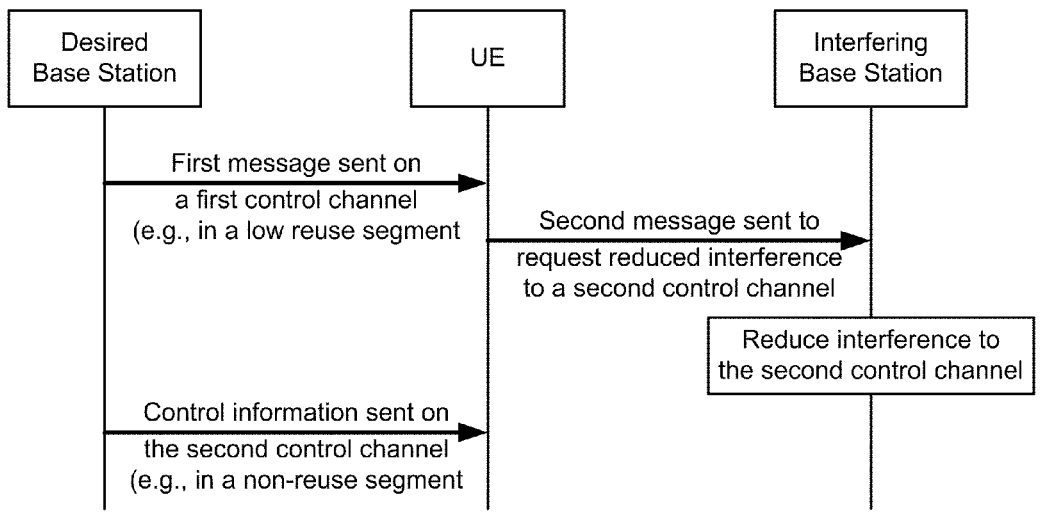
FIGS. 3 and 4 show use of a first control channel to configure a second control channel for the downlink and uplink, respectively.

FIG. 3 shows a design of using a first control channel to configure a second control channel on the downlink. A UE may be within the coverage of a desired base station as well as an interfering base station and may observe high interference from the interfering base station. The UE may be unable to reliably receive the second control channel from the desired base station due to the high interference from the interfering base station.

The desired base station may send a first message on the first control channel (e.g., in a low reuse segment for the downlink) to the UE. The first message may implicitly or explicitly request the UE to ask the interfering base station to reduce interference on designated resources used for the second control channel by the desired base station. The UE may receive the first message and, in response, may send a second message to the interfering base station to request it to reduce interference on the designated resources for the second control channel. The interfering base station may receive the second message from the UE and may honor the request. The interfering base station may then reduce interference on the designated resources.

The desired base station may send control information on the second control channel on the designated resources (e.g., in a non-reuse segment for the downlink) to the UE. The UE may be able to reliably receive the control information on the second control channel due to less or no interference from the interfering base station on the designated resources.

The first and second control channels may be sent in various manners. In one design, the first control channel may carry broadcast messages sent by the desired base station to all UEs. In another design, the first control channel may carry unicast messages sent by the desired base station to specific UEs. In yet another design, the first control channel may carry multicast messages sent by the desired base station to groups of UEs.

The second message may also be sent in various manners by the UE. In one design, the second message may be a broadcast message sent to all interfering base stations. In another design, the second message may be a unicast message sent specifically to a dominant interfering base station. In yet another design, the second message may be multicast message sent to a group of interfering base stations causing sufficiently high interference to the UE.

In one design, the first message may be a low-reuse preamble (LRP) sent on the first control channel in the low reuse segment to enable cell detection by UEs in dominant interference scenarios. The second control channel may carry synchronization signals for timing information, system information, etc., and may be sent on designated resources in the non-reuse segment. The designated resources may comprise a designated frequency subband, a designated time interlace, etc., and may be known a priori by the base stations and UEs. Alternatively, the LRP may include information about the designated resources. Additional control channels may also be sent in the non-reuse segment to carry other control information.

A UE may detect an LRP from the desired base station. The UE may determine that it is operating in a dominant interference scenario and may request the interfering base station to reduce interference on the designated resources used for the second control channel. The UE can then reliably receive the synchronization signals, system information, etc., sent on the second control channel.

In another design, the first message may be a pre-link assignment block (preLAB) message sent on the first control channel in the low reuse segment to a specific UE. The preLAB message may also be referred to as a pre-assignment message, a pre-grant message, etc. The preLAB message may ask the UE to request its dominant interfering base station to reduce interference on particular resources, which may be conveyed by the preLAB message. The UE may then send a request for reduced interference to the interfering base station. The UE may thereafter receive control information such as an assignment, an acknowledgment, etc., on the particular resources from the desired base station. The UE may also receive data from the desired base station on the particular resources.

In one design, the desired base station may send the second control channel in the same manner all the time. Each UE observing high interference may request its dominant interfering base station to reduce interference on the designated resources to allow that UE to receive the second control channel from the desired base station. The configuration (e.g., the reuse) of the second control channel may be changed due to the interfering base station reducing interference to the second control channel. This design may be especially applicable for the case in which the first and second control channels are broadcast by the desired base station, e.g., the LRP described above.

In another design, the desired base station may send the second control channel in a configurable manner (e.g., on configurable resources) and may use the first control channel to convey the configuration. The reuse of the second control channel may also be changed by the interfering base station reducing interference to the second control channel. This design may be especially applicable for the case in which the second control channel is sent in a unicast manner by the desired base station, e.g., the preLAB message described above.

Figure 4:
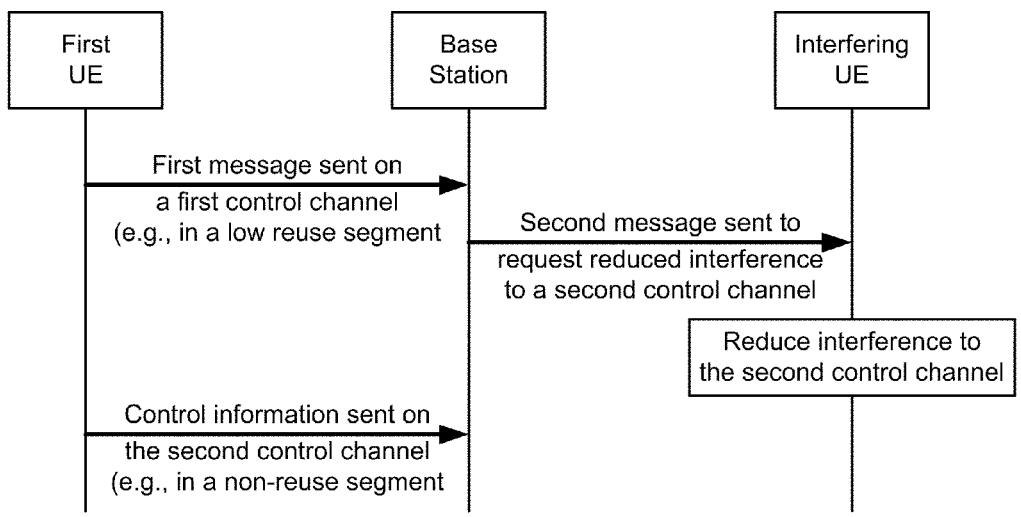

FIG. 4 shows a design of using a first control channel to configure a second control channel on the uplink. A base station may have a first UE as well as an interfering UE within its coverage and may observe high interference from the interfering UE. The base station may be unable to receive the second control channel from the first UE due to the high interference from the interfering UE.

The first UE may send a first message on the first control channel (e.g., in a low reuse segment for the uplink) to the base station. The first message may implicitly or explicitly request the base station to ask the interfering UE to reduce interference on designated resources used for the second control channel by the first UE. The base station may receive the first message and, in response, may send a second message to the interfering UE to request it to reduce interference on the designated resources. The interfering UE may receive the second message from the base station and may honor the request. The interfering UE may then reduce interference on the designated resources. The first UE may send control information on the second control channel on the designated resources (e.g., in a non-reuse segment for the uplink) to the base station. The base station may be able to reliably receive the control information on the second control channel due to less or no interference from the interfering UE on the designated resources.

In one design, the first message may be an access probe sent by the first UE on the first control channel (e.g., an access channel) to access the base station. The second control channel may carry control information used to register with the base station, to request for resources, etc. In another design, the first message may be a resource request sent by the first UE on the first control channel to request the base station for resources for data transmission on the uplink. The second control channel may carry control information and/or data for the uplink data transmission. The first and second control channels may also carry other information. The first and second messages may be sent in different manners, e.g., as described above for FIG. 3.

In general, a receiving station may receive the first control channel (e.g., in a low reuse segment) and may request an interfering station to reduce interference on designated resources used for the second control channel (e.g., in a non-reuse segment). The interference reduction or blanking may last for a particular duration, which may be conveyed implicitly or explicitly by the request. For example, the duration of the interference reduction may be (i) implicitly conveyed if a fixed amount of time is needed to receive the information on the second control channel or (ii) explicitly conveyed if a variable amount of time is needed to receive the information on the second control channel. The interference reduction or blanking may also occur on resources that may be conveyed implicitly or explicitly by the request. For example, the resources may be (i) implicitly conveyed if the second control channel is sent on fixed resources or (ii) explicitly conveyed if the second control channel can be sent on configurable resources.

The techniques described herein may enable reliable reception of control channels in dominant interference scenarios. For a given link, the control channels sent in a non-reuse segment may support communication and may comprise overhead channels, paging channels, assignment channels, feedback channels, etc. One or more control channels may be sent in a low reuse segment and may be used to configure (e.g., change the reuse of) the control channels sent in the non-reuse segment. The payloads of the control channel(s) sent in the low reuse segment may be small, and the amount of resources used to support the low reuse segment may be small.

In one design, semi-static interference control may be used for a first control channel, and dynamic interference control may be used for a second control channel. For semi-static interference control, the first control channel may be sent in accordance with a semi-static configuration (e.g., semi-statically assigned resources) to achieve the desired performance. For dynamic interference control, the second control channel may be sent with a dynamic configuration (e.g., dynamically assigned resources), which may be selected or changed based interference conditions. For example, the first control channel may be used to change the dynamic configuration of the second control channel based on the interference conditions. The first control channel may be used as a bootstrapping mechanism to activate and/or configure the second control channel.

Figure 5:
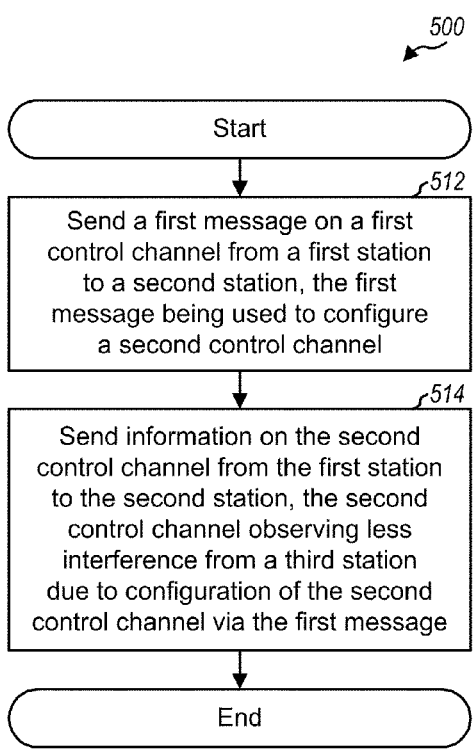
FIG. 5 shows a process for sending control information.

FIG. 5 shows a design of a process 500 for sending control information. Process 500 may be performed by a first station, which may be a base station, a UE, a relay, or some other entity. The first station may send a first message on a first control channel to a second station (block 512). The first message may be used to configure a second control channel. The first station may send information on the second control channel to the second station (block 514). The second control channel may observe less interference from a third station due to the second control channel being configured via the first message.

In one design, the first control channel may be sent in a first segment (e.g., a low reuse segment) with a reuse factor of greater than one. The second control channel may be sent in a second segment (e.g., a non-reuse segment) with a default reuse factor of one. The first message may be used to change the reuse of the second control channel. The first message may convey the resources used to send the second control channel, the duration in which less interference is requested for the second control channel, and/or other information.

In one design, the first station may comprise a first base station, the second station may comprise a UE, and the third station may comprise an interfering base station, e.g., as shown in FIG. 3. The first base station and the interfering base station may have different transmit power levels and/or different association types. The first message may comprise a broadcast message sent to all UEs within range of the first base station or a unicast message sent specifically to the UE. In one design, the first message may comprise an LRP used by UEs to detect the first base station. The second control channel may carry synchronization information, system information, and/or other information from the first base station. In another design, the first message may comprise a pre-assignment (e.g., a preLAB) message for the UE. The second control channel may carry a resource assignment message for the UE.

In another design, the first station may comprise a first UE, the second station may comprise a base station, and the third station may comprise an interfering UE, e.g., as shown in FIG. 4. The first message may comprise an access probe sent by the first UE to access the base station, a resource request sent by the first UE to request for resources for data transmission on the uplink, or some other message.

Figure 6:
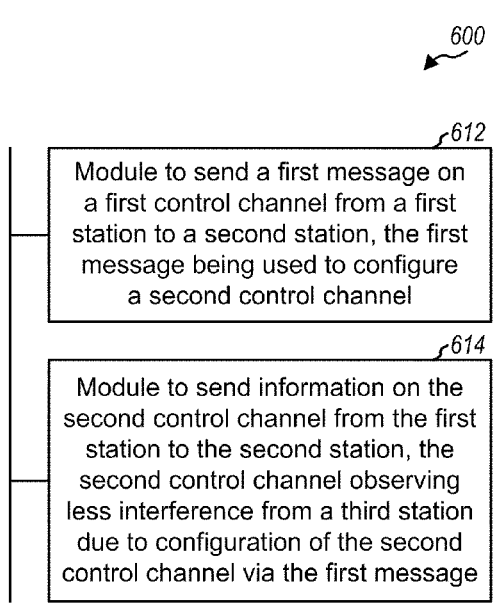
FIG. 6 shows an apparatus for sending control information.

FIG. 6 shows a design of an apparatus 600 for sending control information. Apparatus 600 includes a module 612 to send a first message on a first control channel from a first station to a second station to configure a second control channel, and a module 614 to send information on the second control channel from the first station to the second station.

Figures 7, 8:
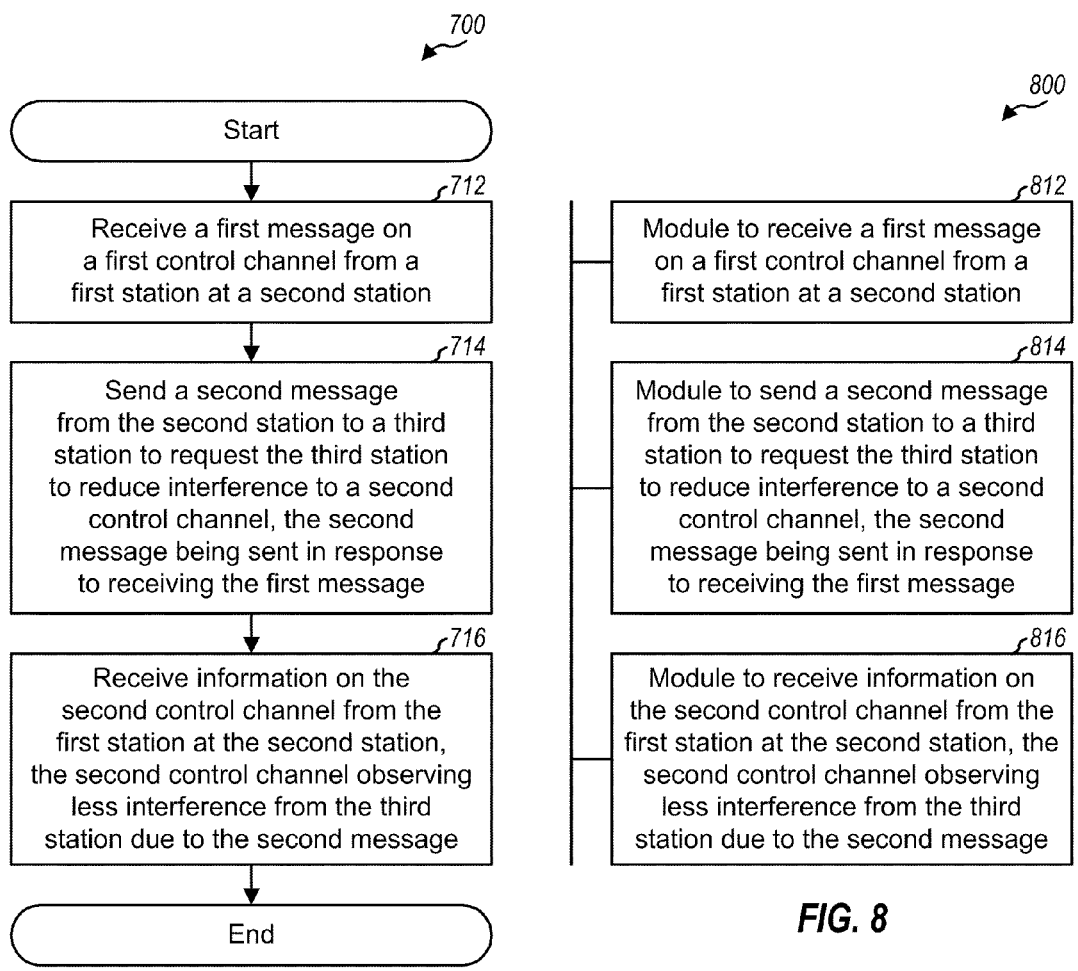
FIG. 7 shows a process for receiving control information.
FIG. 8 shows an apparatus for receiving control information.

FIG. 7 shows a design of a process 700 for receiving control information. Process 700 may be performed by a second station, which may be a UE, a base station, a relay, or some other entity. The second station may receive a first message on a first control channel from a first station (block 712). The second station may send a second message to a third station to request the third station to reduce interference to a second control channel (block 714). The second station may send the second message in response to receiving the first message. The second station may receive information on the second control channel from the first station (block 716). The second control channel may observe less interference from the third station due to the second message.

In one design, the second station may receive the first control channel in a first segment with a reuse factor of greater than one and may receive the second control channel in a second segment with a default reuse factor of one. The second message may change the reuse of the second control channel. In one design, the first station may comprise a first base station, the second station may comprise a UE, and the third station may comprise an interfering base station, e.g., as shown in FIG. 3. In another design, the first station may comprise a first UE, the second station may comprise a base station, and the third station may comprise an interfering UE, e.g., as shown in FIG. 4.

FIG. 8 shows a design of an apparatus 800 for receiving control information. Apparatus 800 includes a module 812 to receive a first message on a first control channel from a first station at a second station, a module 814 to send a second message from the second station to a third station to request the third station to reduce interference to a second control channel, and a module 816 to receive information on the second control channel from the first station at the second station.

Figures 9, 10:
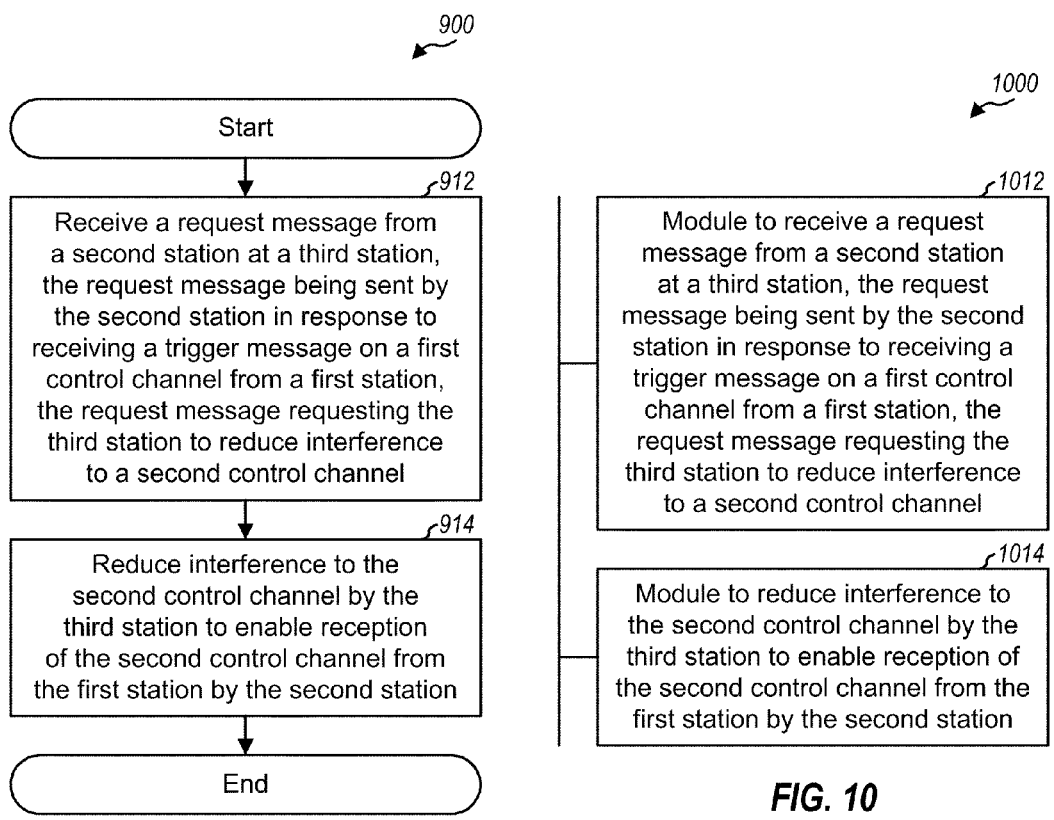
FIG. 9 shows a process for mitigating interference.
FIG. 10 shows an apparatus for mitigating interference.

FIG. 9 shows a design of a process 900 for mitigating interference to transmission from a first station to a second station. Process 900 may be performed by a third station, which may be a base station, a UE, a relay, or some other entity. The third station may receive a request message from the second station (block 912). The request message may be sent by the second station in response to receiving a trigger message on a first control channel from the first station. The request message may request the third station to reduce interference to a second control channel. The third station may reduce interference to the second control channel to enable reception of the second control channel from the first station by the second station (block 914). The third station may reduce interference to the second control channel for an amount of time implicitly or explicitly conveyed by the request message. The third station may reduce interference on resources used for the second control channel, which may be implicitly or explicitly conveyed by the request message. The third station may reduce its transmit power to zero or a lower level on the resources used for the second control channel.

In one design, the first station may comprise a first base station, the second station may comprise a UE, and the third station may comprise an interfering base station, e.g., as shown in FIG. 3. In another design, the first station may comprise a first UE, the second station may comprise a base station, and the third station may comprise an interfering UE, e.g., as shown in FIG. 4.

FIG. 10 shows a design of an apparatus 1000 for mitigating interference to transmission from a first station to a second station. Apparatus 1000 includes a module 1012 to receive a request message from the second station at a third station, and a module 1014 to reduce interference to a second control channel by the third station to enable reception of the second control channel from the first station by the second station.

The modules in FIGS. 6, 8 and 10 may comprise processors, electronics devices, hardware devices, electronics components, logical circuits, memories, software codes, firmware codes, etc., or any combination thereof.

Figure 11:
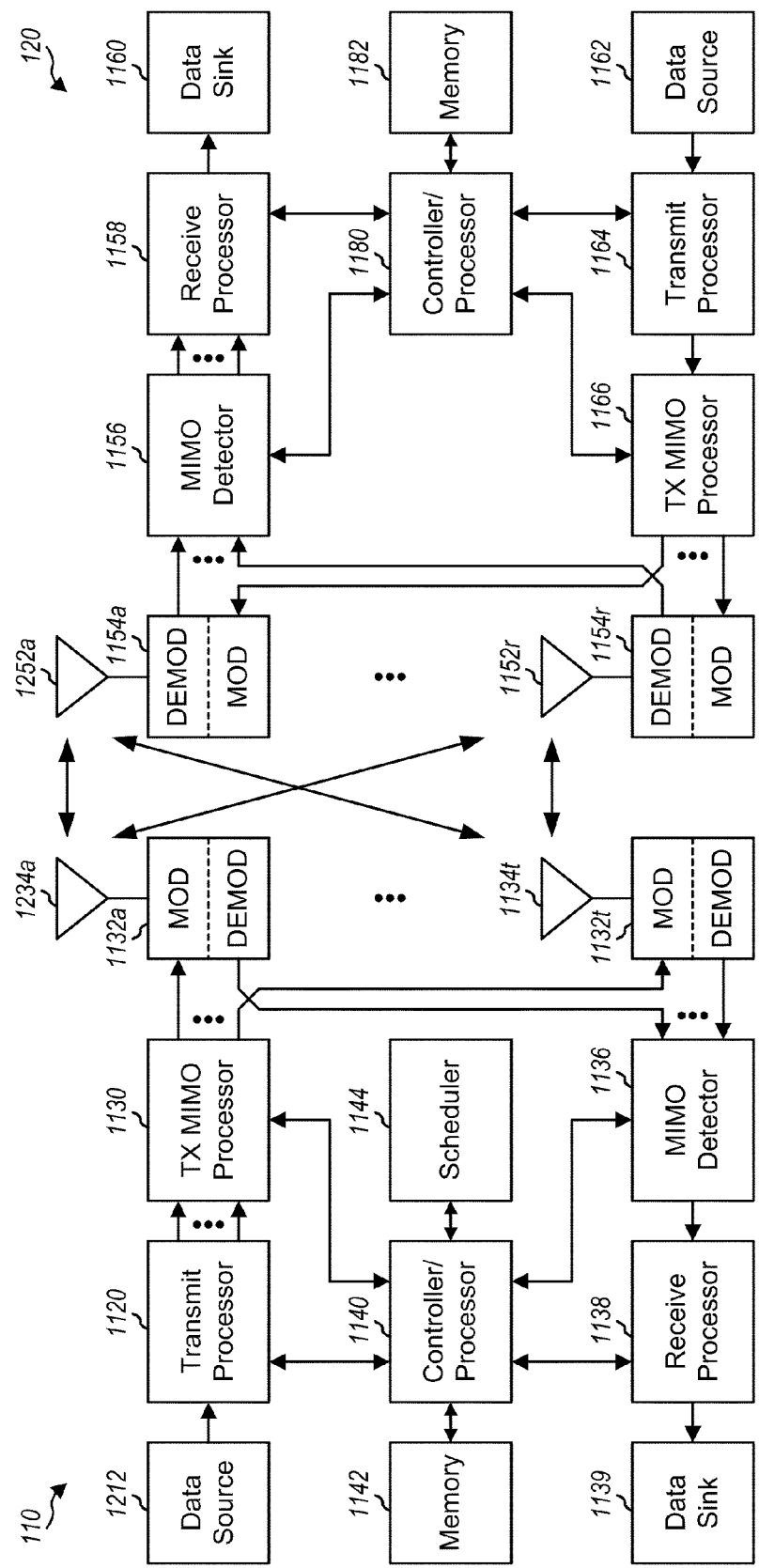
FIG. 11 shows a block diagram of a base station and a UE.

FIG. 11 shows a block diagram of a design of a base station 110 and a UE 120, which may be one of the base stations and one of the UEs in FIG. 1. Base station 110 may be equipped with T antennas 1134a through 1134t, and UE 120 may be equipped with r antennas 1152a through 1152r, where in general T≥1 and R≥1.

At base station 110, a transmit processor 1120 may receive data from a data source 1112 and control information from a controller/processor 1140. The control information may be for control channels sent in low reuse and non-reuse segments for the downlink. Processor 1120 may process (e.g., encode and symbol map) the data and control information to obtain data symbols and control symbols, respectively. Processor 1120 may also generate pilot symbols. A transmit (TX) multiple-input multiple-output (MIMO) processor 1130 may perform spatial processing (e.g., preceding) on the data symbols, the control symbols, and/or the pilot symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and other base stations and may provide received signals to demodulators (DE-MODs) 1154a through 1154r, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate, deinterleave, and decode) the detected symbols, provide decoded data for UE 120 to a data sink 1160, and provide decoded control information to a controller/processor 1180.

On the uplink, at UE 120, a transmit processor 1164 may receive and process data from a data source 1162 and control information from controller/processor 1180. The control information may be for control channels sent in low reuse and non-reuse segments for the uplink. Processor 1164 may also generate pilot symbols. The symbols from transmit processor 1164 may be precoded by a TX MIMO processor 1166 if applicable, further processed by modulators 1154a through 1154r (e.g., for SC-FDM, etc.), and transmitted to base station 110. At base station 110, the uplink signals from UE 120 and other UEs may be received by antennas 1134, processed by demodulators 1132, detected by a MIMO detector 1136 if applicable, and further processed by a receive processor 1138 to obtain decoded data and control information sent by UE 120. Processor 1138 may provide the decoded data to a data sink 1139 and the decoded control information to controller/processor 1140.

Controllers/processors 1140 and 1180 may direct the operation at base station 110 and UE 120, respectively. Processor 1140 and/or other processors and modules at base station 110 may perform or direct process 500 in FIG. 5, process 700 in FIG. 7, process 900 in FIG. 9, and/or other processes for the techniques described herein. Processor 1180 and/or other processors and modules at UE 120 may also perform or direct process 500 in FIG. 5, process 700 in FIG. 7, process 900 in FIG. 9, and/or other processes for the techniques described herein. Memories 1142 and 1182 may store data and program codes for base station 110 and UE 120, respectively. A scheduler 1144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    sending a first message, from a first base station to a user equipment (UE), on a first control channel sent on a low reuse segment with a reuse factor greater than one indicating that a resource may be used by a first plurality of base stations; and
    sending information on a second control channel, having a non-reuse segment with a reuse factor of one indicating that the resource may be used by a second plurality of base stations that is greater than the first plurality of base stations, from the first base station to the UE, the second control channel observing less interference from an interfering base station due to the interfering base station reducing interference, based at least in part on a second message from the UE, on resources designated for the second control channel,
    the second message being sent based on a request associated with the first message.

2. The method of claim 1, wherein the first message is used to change a reuse factor of the second control channel.

3. The method of claim 1, wherein the first message conveys resources associated with the second control channel, or a duration in which less interference is requested for the second control channel, or both.

4. The method of claim 1, wherein the first message comprises a broadcast message sent to all UEs within range of the first base station.

5. The method of claim 1, wherein the first message comprises a unicast message sent specifically to the UE.

6. The method of claim 1, wherein the first message comprises a low reuse preamble (LRP) used by the UE to detect the first base station.

7. The method of claim 1, wherein the second control channel carries synchronization information, or system information, or both, from the first base station.

8. The method of claim 1, wherein the first message comprises a pre-assignment message for the UE, and wherein the second control channel carries a resource assignment message for the UE.

9. The method of claim 1, wherein the first base station and the interfering base station have different transmit power levels or different association types.

10. An apparatus for wireless communication, comprising:
    means for sending a first message to a user equipment (UE), on a first control channel sent on a low reuse segment with a reuse factor greater than one indicating that a resource may be used by a first plurality of base stations; and
    means for sending information on a second control channel, having a non-reuse segment with a reuse factor of one indicating that the resource may be used by a second plurality of base stations that is greater than the first plurality of base stations, to the UE, the second control channel observing less interference from an interfering base station due to the interfering base station reducing interference, based at least in part on a second message from the UE, on resources designated for the second control channel,
    the second message being sent based on a request associated with the first message.

11. The apparatus of claim 10, wherein the first message is used to change a reuse factor of the second control channel.

12. The apparatus of claim 10, wherein the first message comprises a broadcast message sent to all UEs within range of the apparatus.

13. The apparatus of claim 10, wherein the first message comprises a unicast message sent specifically to the UE.

14. An apparatus for wireless communication, comprising:
    at least one processor configured to:
        send a first message, to a user equipment (UE), on a first control channel sent on a low reuse segment with a reuse factor greater than one indicating that a resource may be used by a first plurality of base stations, and
        send information on a second control channel, having a non-reuse segment with a reuse factor of one indicating that the resource may be used by a second plurality of base stations that is greater than the first plurality of base stations, to the UE, the second control channel observing less interference from an interfering base station due to the interfering base station reducing interference, based at least in part on a second message from the UE, on resources designated for the second control channel,
the second message being sent based on a request associated with the first message.

15. The apparatus of claim 14, wherein the first message is used to change a reuse factor of the second control channel.

16. The apparatus of claim 14, wherein the first message comprises a broadcast message sent to all UEs within range of the apparatus.

17. The apparatus of claim 14, wherein the first message comprises a unicast message sent specifically to the UE.

18. A non-transitory computer-readable medium storing instructions, the instructions comprising:
one or more instructions which, when executed by a processor, cause the processor to:
cause at least one computer to send a first message, from a first base station to a user equipment (UE), on a first control channel sent on a low reuse segment with a reuse factor greater than one indicating that a resource may be used by a first plurality of base stations; and
cause the at least one computer to send information on a second control channel, having a non-reuse segment with a reuse factor of one indicating that the resource may be used by a second plurality of base stations that is greater than the first plurality of base stations, from the first base station to the UE, the second control channel observing less interference from an interfering base station due to the interfering base station reducing interference, based at least in part on a second message from the UE, on resources designated for the second control channel,
the second message being sent based on a request associated with the first message.

19. A method for wireless communication, comprising:
receiving a first message, from a first base station and at a user equipment (UE), on a first control channel sent on a low reuse segment with a reuse factor greater than one indicating that a resource may be used by a plurality of base stations;
sending a second message from the UE to an interfering base station to request the interfering base station to reduce interference to a second control channel, the second message being sent in response to receiving the first message and based on a request, associated with the first message, instructing the UE to send the second message; and
receiving information on the second control channel from the first base station at the UE, the second control channel observing less interference from the interfering station due to the interfering base station reducing interference, based at least in part on the second message, on resources designated for the second control channel.

20. The method of claim 19, wherein the second message changes a reuse factor of the second control channel.

21. An apparatus for wireless communication, comprising:
means for receiving a first message from a first base station, on a first control channel sent on a low reuse segment with a reuse factor greater than one indicating that a resource may be used by a plurality of base stations;
means for sending a second message to an interfering base station to request the interfering base station to reduce interference to a second control channel, the second message being sent in response to receiving the first message and based on a request, associated with the first message, instructing the UE to send the second message; and
means for receiving information on the second control channel from the first base station, the second control channel observing less interference from the interfering base station due to the interfering base station reducing interference, based at least in part on the second message, on resources designated for the second control channel.

22. The apparatus of claim 21, wherein the second message changes a reuse factor of the second control channel.

23. A method of supporting transmission of information from a first base station to a user equipment (UE) in a wireless communication network, comprising:
receiving a request message from the UE at an interfering base station,
the request message being sent by the UE in response to the UE receiving a trigger message and based on a request associated with the trigger message, from the first base station and on a first control channel sent on a low reuse segment with a reuse factor greater than one indicating that a resource may be used by a first plurality of base stations, and
the request message requesting the interfering base station to reduce interference to a second control channel sent on a non-reuse segment with a reuse factor of one indicating that the resource may be used by a second plurality of base stations that is greater than the first plurality of base stations; and
reducing interference, based at least in part on the request message, to the second control channel by the interfering base station to enable reception of the second control channel from the first base station by the UE.

24. The method of claim 23, wherein the reducing interference comprises reducing interference to the second control channel for an amount of time implicitly or explicitly conveyed by the request message.

25. The method of claim 23, wherein the reducing interference comprises reducing interference on resources used for the second control channel, the resources being implicitly or explicitly conveyed by the request message.

26. The method of claim 23, wherein the reducing interference comprises reducing transmit power of the interfering base station to zero or a lower level on resources used for the second control channel.

27. An apparatus for supporting transmission of information from a first base station to a user equipment (UE) in a wireless communication network, comprising:
means for receiving a request message from the UE,
the request message being sent by the UE in response to the UE receiving a trigger message and based on a request associated with the trigger message, from the first base station and on a first control channel sent on a low reuse segment with a reuse factor greater than one indicating that a resource may be used by a first plurality of base stations, and
the request message requesting the apparatus to reduce interference to a second control channel sent on a non-reuse segment with a reuse factor of one indicating that the resource may be used by a second plurality of base stations that is greater than the first plurality of base stations; and
means for reducing interference, based at least in part on the request message, to the second control channel to enable reception of the second control channel from the first base station by the UE.

28. The apparatus of claim 27, wherein the means for reducing interference comprises means for reducing interference to the second control channel for an amount of time implicitly or explicitly conveyed by the request message.

29. The apparatus of claim 27, wherein the means for reducing interference comprises means for reducing interference on resources used for the second control channel, the resources being implicitly or explicitly conveyed by the request message.

30. The apparatus of claim 27, wherein the means for reducing interference comprises means for reducing transmit power of the apparatus to zero or a lower level on resources used for the second control channel.

* * * * *